(12) United States Patent
Boitard et al.

(10) Patent No.: US 9,767,542 B2
(45) Date of Patent: Sep. 19, 2017

(54) METHOD AND DEVICE FOR SELECTING AN IMAGE DYNAMIC RANGE CONVERSION OPERATOR

(71) Applicant: THOMSON LICENSING, Issy de Moulineaux (FR)

(72) Inventors: Ronan Boitard, Belz (FR); Dominique Thoreau, Cesson Sevigne (FR); Kadi Bouatouch, Rennes (FR); Remi Cozot, Rennes (FR)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/771,199

(22) PCT Filed: Feb. 25, 2014

(86) PCT No.: PCT/EP2014/053625
§ 371 (c)(1),
(2) Date: Aug. 27, 2015

(87) PCT Pub. No.: WO2014/131755
PCT Pub. Date: Sep. 4, 2014

(65) Prior Publication Data
US 2016/0012573 A1 Jan. 14, 2016

(30) Foreign Application Priority Data

Feb. 27, 2013 (FR) ...................................... 13 51721

(51) Int. Cl.
*G06K 9/36* (2006.01)
*G06T 5/00* (2006.01)
(Continued)

(52) U.S. Cl.
CPC ............ *G06T 5/007* (2013.01); *G06K 9/4661* (2013.01); *H04N 19/147* (2014.11); *H04N 19/154* (2014.11); *G06T 2207/20208* (2013.01)

(58) Field of Classification Search
CPC .................. H04N 19/147; H04N 19/15; G06T 2207/20208; G06T 2207/10024; G06T 5/007
See application file for complete search history.

(56) References Cited

U.S. PATENT DOCUMENTS

| 5,734,433 | A | * | 3/1998 | Kondo | .................. H04N 19/98 375/240.03 |
| 6,091,777 | A | * | 7/2000 | Guetz | .................. H04N 19/172 375/240.03 |
| 2011/0235720 | A1 | * | 9/2011 | Banterle | ................. G06T 5/009 375/240.25 |

FOREIGN PATENT DOCUMENTS

| CN | 102388611 | 3/2012 |
| CN | 102473289 | 5/2012 |

(Continued)

OTHER PUBLICATIONS

Chen et al: "JPEG Compatible Coding of High Dynamic Range Imagery using Tone Mapping Operators" 25. Picture Coding Symposium; Apr. 24, 2006; Apr. 24, 2006 (Apr. 24, 2006), pp. 1-6.

(Continued)

*Primary Examiner* — Eueng-Nan Yeh
(74) *Attorney, Agent, or Firm* — Tutunjian @ Bitetto, P.C.

(57) ABSTRACT

The invention relates to a method for selecting an image dynamic range conversion operator from among a set of image dynamic range conversion operators by optimizing a quality criterion, each image dynamic range conversion operator being applied to an original image to obtain an image, called the modified image, whose dynamic range is lower than that of the original image, wherein said quality (Continued)

criterion is calculated, for each image dynamic range conversion operator, as a function of a distortion calculated from a reconstructed version after coding and decoding the original image modified by said image dynamic range conversion operator.

7 Claims, 3 Drawing Sheets (51) Int. Cl.
*H04N 19/147* (2014.01)
*H04N 19/154* (2014.01)
*G06K 9/46* (2006.01)

(56) References Cited

FOREIGN PATENT DOCUMENTS

| CN | 102857674 | 1/2013 |
|---|---|---|
| EP | 2009921 | 12/2008 |
| EP | 2144444 | 1/2010 |
| EP | 2541893 | 1/2013 |
| WO | WO2010093432 | 8/2010 |
| WO | WO2011014170 | 2/2011 |

OTHER PUBLICATIONS

Mai et al: "Tone mapping high dynamic range images and videos for bit-depth scalable coding and 3D displaying" Jan. 1, 2012 (Jan. 1, 2012); pp. 1-162.

Sugiyama et al: "HDR image compression using optimized tone mapping model" Acoustics, Speech and Signal Processing, 2009. ICASSP 2009. IEEE International Conference on, IEEE, Apr. 19, 2009 (Apr. 19, 2009); pp. 1001-1004.

Mai et al: "Visually-Favorable Tone-Mapping With High Compression Performance" 2010 Proceedings of 17th IEEE International Conference on Image Processing (ICIP 2010); Sep. 26-29, 2010; pp. 1285-1288.

Yeganeh et al: "Structural Fidelity vs. Naturalness—Objective Assessment of Tone Mapped Images" Univ Waterloo | Dept Elect & Comp EngnImage Analysis and Recognition, Proceedings 8th International Conference, ICIAR 2011; pp. 1-11, (published before this application Aug. 2015).

Mai et al: "On-The-Fly Tone Mapping for Backward-Compatible High Dynamic Range Image Video Compression" 2010 IEEE International Symposium on Circuits and Systems. ISCAS 2010; pp. 1831-1834, (published before this application Aug. 2015).

Kang et al: "High dynamic range video" ACM SIGGRAPH 2003 Papers on—SIGGRAPH '03 ], 319, ACM Press, New York, New York, USA (2003); pp. 1-7, (published before this application Aug. 2015).

Ramsey et al: "Adaptive temporal tone mapping" Computer Graphics and Imaging—2004 (3), 3{7 (2004); pp. 1-5, (published before this application Aug. 2015).

Mantiuk et al: "Display adaptive tone mapping" ACM Transactions on Graph-ics 27, Aug. 1, 2008; pp. 1-10.

Boitard et al: "Temporal coherency for video tone mapping" in Proc. SPIE 8499, Applications of Digital Image Processing XXXV, 2012; pp. 1-10, (published before this application Aug. 2015).

Yoshida et al: "Perceptual evaluation of tone mapping operators with real-world scenes" Proceedings of SPIE 2005, vol. 5666, pp. 192-203, SPIE, (published before this application Aug. 2015).

Boitard et al: "Impact of Temporal Coherence-Based Tone Mapping on Video"; 2013; pp. 1-5, (published before this application Aug. 2015).

Adams: "The Print: The Ansel Adams Photography" Little, Brown and Compagny, 1981; pp. 1-224, (published before this application Aug. 2015).

Mai et al: "Optimizing a tone curve for backward-compatible highdynamic range image and video compression.," IEEE transactions on image processing, Jun. 2011; vol. 20, No. 6, pp. 1558-1571.

Sullivan et al: "Overview of the High Efficiency Video Coding (HEVC) Standard," IEEE Transactions on Circuits and Systems for Video Technology, vol. 22, No. 12, pp. 1649-1668, Dec. 2012.

Tocci et al: "A versatile HDR video production system" ACM SIGGRAPH 2011 papers on—SIGGRAPH '11; 2011, ACM Press; pp. 1-9, (published before this application Aug. 2015).

Krawczyk: "Tunnel video sequence-screenshot" http://resources.mpi-inf.mpg.de/hdr/video/; 2006; p. 1, (published before this application Aug. 2015).

Ledda et al: "Evaluation of tone mapping operators using a High Dynamic Range display" ACMSIG-GRAPH 2005 Papers, NewYork, NY, USA,2005SIGGRAPH'05, pp. 640-648, ACM, (published before this application Aug. 2015).

Search Report Dated May 27, 2014.

Wang, et al., Research of High Dynamic Range Image Display and Compression, China Academic Journal Electronic Publishing House, Apr. 2008, 67 pages.

\* cited by examiner

METHOD AND DEVICE FOR SELECTING AN IMAGE DYNAMIC RANGE CONVERSION OPERATOR

This application claims the benefit, under 35 U.S.C. §365 of International Application PCT/EP2014/053625, filed Feb. 25, 2014, which was published in accordance with PCT Article 21(2) on Sep. 4, 2014 in English and which claims the benefit of French patent application No. 1351721, filed Feb. 27, 2013.

1. FIELD OF THE INVENTION

The invention relates to the general field of converting the dynamic range of images and coding images whose dynamic range has been converted.

The invention relates to a device and a method for selecting an image dynamic range conversion operator from among a set of image dynamic range conversion operators.

This device and method can be used, for example, to reduce the dynamic range of an image, or of an image sequence, that is to say to modify the luminance values of the pixels of this image (or of each of the images of an image sequence) which belong to a given dynamic value range so as to obtain luminance values which belong to a lower dynamic value range that of the original image (of the original image sequence).

Such a method or device can be used in a method respectively device for coding images or image sequences such as those used to code images (or image sequences) of significant and/or reduced dynamic range.

2. PRIOR ART

It is known to use tone mapping operators (TMOs) or tone reproducers to modify (also referred to as convert or adapt) the dynamic range of an image called the original image which can be, for example, acquired by a high dynamic range camera so as to obtain an image whose dynamic range is lower (a low dynamic range image) so as to adapt the dynamic range of the original image to that, for example, of a screen on which this image is displayed.

Hereafter, converting, adapting or modifying the dynamic range of an image is equivalent to converting, adapting or modifying the luminance component (values) of this image.

If once its dynamic range is modified the original image is intended for a display system, the luminance component of this adapted image is quantised and encoded so as to be compatible with a display standard (BT 709, etc.). In this case, we usually refer to luma components rather than luminance components. The luminance, for its part, corresponds to a physical unit expressed in cd/m².

The invention is equally applicable to a luminance component and a luma component.

One of these TMOs is that developed by Reinhard which is commonly called a PTR operator (Reinhard, E., Stark, M., Shirley, P., and Ferwerda, J., "*Photographic tone reproduction for digital images,*" ACM Transactions on Graphics 21 (July 2002)).

The principle of this image dynamic range conversion operator is to modify the luminance component $L_W$ of an original image so as to obtain a modified luminance component $L_d$ of the image by using a sigmoid mapping curve given by equation (1):

$$L_d = \frac{L_s}{1+L_s} \cdot \left(1 + \frac{L_s}{L_{white}^2}\right) \quad (1)$$

where $L_{white}$ is a luminance value used to reduce zones with high luminance values, $L_d$ is a matrix whose size is that of the image and which comprises the luminance values of the pixels of the image which are expressed in a lower dynamic value range than that of the original image and $L_s$ is a matrix whose size is that of the image and which comprises the luminance values obtained by equation (2):

$$L_s = \frac{a}{k} \cdot L_w \quad (2)$$

where a is a chosen exposure value, and k, commonly called a key, defines an indication of the brightness of the image given by equation (3):

$$k = \exp\left(\frac{1}{N} \cdot \sum_{i=1}^{N} \log(\delta + L_w(i))\right) \quad (3)$$

where N is the number of pixels in the image, δ is a value which avoids any singularity and $L_w(i)$ is the luminance value of a pixel i of the luminance component $L_w$ of the image.

The values a and $L_{white}$ are two parameters of this TMO which are fixed, for example, at 18% for parameter a and at the maximum luminance value of the original image for parameter $L_{white}$. Equation (1) can be reformulated ignoring the factor used to reduce zones with high luminance values:

$$L_d = \frac{L_s}{1+L_s} \quad (4)$$

It is also known to use operators which modify the dynamic range of each image of an image sequence independently of the dynamic range of the other images of this image sequence and to choose, for each conversion of an image, a key according to the pixels of this image and the pixels of a predetermined number of images which temporally precede the image to be converted in the image sequence (Kang, S. B., Uyttendaele, M., Winder, S., and Szeliski, R., "*High dynamic range video,*" in [ACM SIGGRAPH 2003 Papers on—SIGGRAPH '03], 319, ACM Press, New York, N.Y., USA (2003)).

More specifically, the key is calculated from equation (3) wherein N is equal to the sum of the number of pixels in the image to be converted and the numbers of pixels in the images which temporally precede it in the image sequence.

It is also known to use operators which use a number of preceding images which is dynamically adapted according to the key of the current image and those of the preceding images (Ramsey, S., III, J. J., and Hansen, C., "*Adaptive temporal tone mapping,*" Computer Graphics and Imaging—2004 (3), 3-7 (2004)).

It is also known to use operators which compare an original image using a visual response of the humans visual system (HVS) with an image whose luminance values belong to a dynamic range adapted to a screen (Mantiuk, R., Daly, S., and Kerofsky, L., "*Display adaptive tone mapping*" ACM Transactions on Graphics 27, 1 (August 2008)) which makes it possible to obtain an image whose visual perception on this screen is as little distorted as possible. A minimisation of a residual error between the results of the responses of the human visual system is calculated during these methods. This minimisation results in a conversion curve which is piece-wise linear and calculated image by image.

It is also known to apply processing to an image sequence resulting from the application of an image dynamic range conversion operator, previously mentioned, to each image of an original sequence, in order to preserve the temporal coherence of the brightness between the images of the original image sequence.

For example, Boitard et al. (R. Boitard et al., "*Temporal coherency for video tone mapping*," in *Proc. SPIE* 8499, *Applications of Digital Image Processing XXXV*, 2012.) propose that the dynamic range of the values of the luminance component Ld of an image of an original image sequence modified by one of the image dynamic range conversion operators previously mentioned is reduced by a value calculated from a global characteristic of the original image sequence.

The reduced dynamic range luminance component $L'_d$ is then given by equation (5):

$$L'_d = R \cdot L_d \quad (5)$$

According to a variant, the reduced dynamic range luminance component L'd is the given by equation (6):

$$L'_d = (x + (1-x) \cdot R) L_d \quad (6)$$

where x is an offset in the reduction value fixed for example by a user.

In the particular case where the image dynamic range conversion operator is a PTR operator, the value R is given by equation (7):

$$R = \frac{k_p}{k_p + k_v} \quad (7)$$

This latter embodiment makes it possible to preserve the perception of an object present in the original image sequence and to ensure the temporal coherence of the brightness between the images of the original image sequence.

According to an embodiment, the value R is given by equation (8):

$$\frac{k_i^{HDR} \cdot k_{i,max}^{LDR}}{k_{i,max}^{HDR} \cdot k_i^{LDR}} \quad (8)$$

where $k_i^{HDR}$ is the key of the luminance component of the image to be converted of the original image sequence, $k_{i,max}^{HDR}$ is the maximum key from among the keys of the luminance components of the original image sequence, $k_i^{LDR}$ is the key of the modified luminance component Ld of the image to be converted and $k_{i,max}^{LDR}$ is the maximum key from among the keys of the modified luminance components Ld originating from the original image sequence.

It is also known to evaluate an image dynamic range conversion operator such as those previously mentioned. These operators can, potentially, be supplemented by processing which preserves the temporal coherence of the brightness between the images of the original image sequence.

For such an evaluation, it is known to use evaluation criteria which quantify the subjective quality of the image resulting from the application of this operator (Ledda et al., "*Evaluation of tone mapping operators using a high dynamic range display*," in *ACMSIG-GRAPH* 2005 *Papers*, New York, N.Y., USA, 2005, *SIGGRAPH'05*, pp. 640-648, ACM., and AkikoYoshida, "*Perceptual evaluation of tone mapping operators with real-world scenes*," in *Proceedings of SPIE* 2005, vol. 5666, pp. 192-203, SPIE).

However, as these resultant images are very often coded in order to limit their sizes for the purposes of storage or in order to limit their bitrates for the purposes of transmission over communication channels, the inventor has observed that these resultant images once reconstructed after coding and decoding do not systematically have a rendering quality which corresponds to the subjective quality of these resultant images which have been evaluated by said criteria.

3. SUMMARY OF THE INVENTION

The purpose of the invention is to overcome at least one of the disadvantages previously mentioned.

For this purpose, in a general way, the selection of an image dynamic range conversion operator is based on the optimisation of a quality criterion which is a function of a distortion calculated from a reconstructed version after coding and decoding the original image modified by said image dynamic range conversion operator.

Thus, for a given bitrate, the subjective quality of the image of modified dynamic range is optimal for a given bitrate.

According to on of its aspects, the invention relates to a method for selecting an image dynamic range conversion operator from among a set of image dynamic range conversion operators by optimisation of a quality criterion. Each image dynamic range conversion operator being applied to an original image in order to obtain an image, called the modified image, whose dynamic range is lower that that of the original image, the method is characterised in that said quality criterion is calculated, for each image dynamic range conversion operator, as a function of a distortion calculated from a reconstructed version after coding and decoding the image modified by said image dynamic range conversion operator.

According to an embodiment, the distortion is calculated between the original image modified by said image dynamic range conversion operator and said reconstructed version.

According to a variant, the distortion is calculated between said modified original image and said reconstructed version once their dynamic ranges have been extended by application of an operator which is the inverse of that used to obtain said modified original image.

According to a variant, the distortion is calculated between the original image and said reconstructed version once the dynamic range of this reconstructed version has been extended by application of an operator which is the inverse of that used to obtain said modified image.

According to a variant of the method, said quality criterion is also a function of the bitrate of the modified and coded original image.

According to another of its aspects, the invention relates to a device for selecting an image dynamic range conversion operator from among a set of image dynamic range operators. Said device comprising means for applying an image dynamic range conversion operator to an original image in order to obtain an image, called the modified image, whose dynamic range is lower that that of the original image, and means for optimising a quality criterion to select a dynamic range conversion operator, the device is characterised in that the means for optimising the quality criterion are configured so that said quality criterion is calculated for each image dynamic range conversion operator as a function of a distortion calculated from a reconstructed version after coding and decoding the image modified by said image dynamic range conversion operator.

According to another of its aspects, the invention relates to a system for converting an original image sequence whose luminance values belong to a given dynamic value range. Said system comprising several dynamic range conversion operators intended to be applied to the luminance component of each image of the original image sequence in order to obtain a modified luminance component whose values belong to a dynamic value range lower than that of the original image sequence, the system is characterised in that it also comprises a device for selecting a dynamic range conversion operator from among said image dynamic range conversion operators which is in accordance with that previously mentioned.

According to another of its aspects, the invention also relates to a method for coding an original image of given dynamic range using an image whose dynamic range lower than that of the original image has been obtained by application of an image dynamic range conversion operator to the original image. The method is characterised in that the image dynamic range conversion operator is selected from among a set of image dynamic range conversion operators according to a method in accordance with that previously mentioned.

According to another of its aspects, the invention also relates to a device for coding an original image of given dynamic range using an image whose dynamic range lower than that of the original image has been obtained by application of an image dynamic range conversion operator to the original image. The device is characterised in that the image dynamic range conversion operator is selected from among a set of image dynamic range conversion operators according to a device in accordance with that previously mentioned.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

Hereafter are described several embodiments and variants of a method for selecting an image dynamic range conversion operator from among a set of M image dynamic range conversion operators TMOi (i=1 to M). The references common to these embodiments and variants designate the same entities.

This set can, according to an example, comprise one or more of the image dynamic range conversion operators described in the introductory section. Moreover, this term of image dynamic range conversion operator can also include processing which makes it possible to ensure temporal coherence of the brightness between the images of the original image sequence such as that described in the introductory section. This processing, which is applied following an operator, can be applied to one or more of the operators of the set.

In the case where the dynamic range of all the images of an image sequence must be modified (converted or adapted), the image dynamic range conversion operator is applied to each image of the image sequence.

Figure 1:
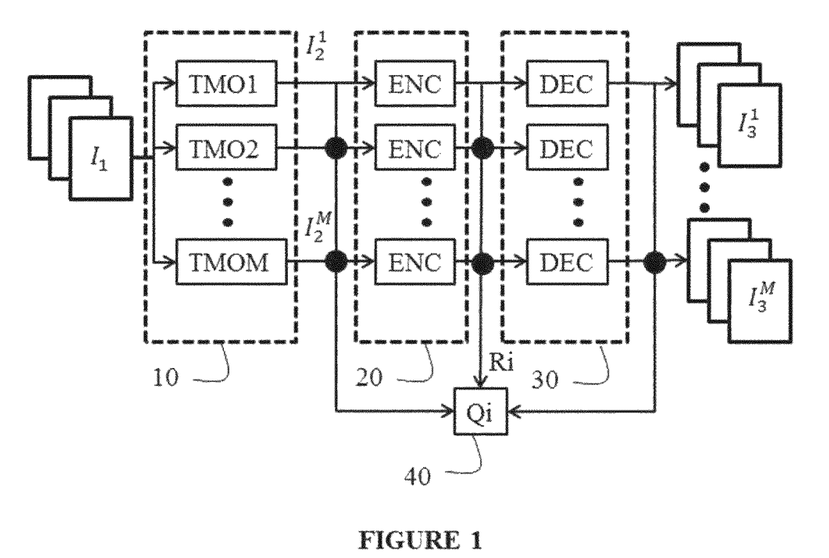
FIG. 1 shows a diagram of an embodiment of the method for selecting an image dynamic range conversion operator.

FIG. 1 diagrammatically shows an embodiment of the method for selecting an image dynamic range conversion operator TMOo from among a set of M image dynamic range conversion operators TMOi (i=1 to M).

The method comprises a step 10 of applying image dynamic range conversion operators during which each operator TMOi of the set is applied to each image $I_1$ presenting itself at the input of the method. A number M of images $I_2^i$ are then obtained at the output of step 10. Each of these images $I_2^i$ is an image called a modified image that is to say an image whose dynamic range is lower than that of the original image $I_1$. Note that there are M images $I_2^i$ for each image $I_1$.

The method also comprises a step 20 of coding during which each image $I_2^i$ is coded according to a known method. This coding method can be, for example, of JPEG type in the case of still images or an image sequence coder for example of ITU-T H.265/MPEG-H Part 2 'High Efficiency Video Codec' (HEVC) type.

The method also comprises a step 30 of reconstructing an image during which an image $I_3^i$ is reconstructed after decoding the code obtained by coding each image $I_2^i$. For this purpose, the code at the output of step 20 is decoded by a dual method of the coding method used during step 20. As many images $I_3^i$ are therefore reconstructed as images $I_2^i$.

In a general way, the method also comprises a step 40 of optimising a quality criterion during which a quality criterion Qi is calculated for each image dynamic range conversion operator TMOi as a function of a distortion Di calculated from a reconstructed version $I_3^i$ after coding and decoding the image $I_2^i$ modified by the image dynamic range conversion operator TMOi.

According to the embodiment of FIG. 1, during step 40, the distortion Di is calculated between an image $I_2^i$ and an image $I_3^i$.

Figure 2:
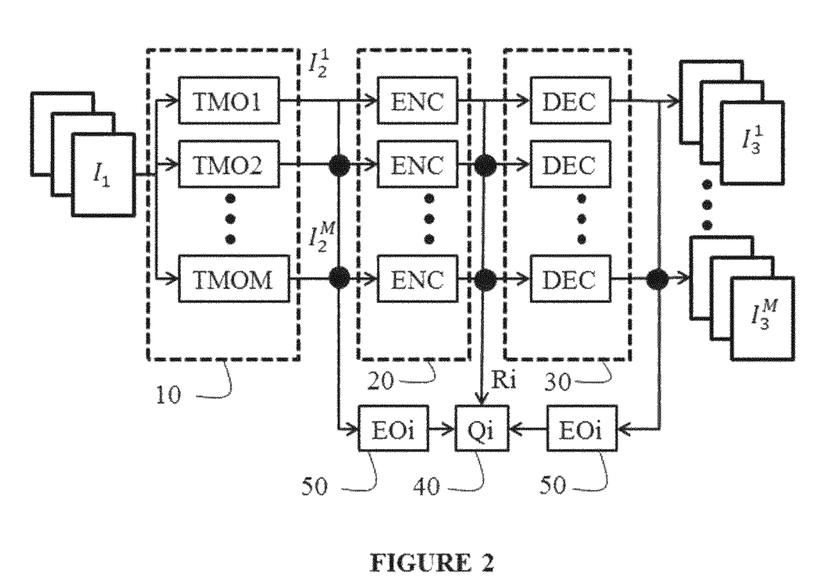
FIG. 2 shows a diagram of a variant of the method for selecting an image dynamic range conversion operator.

FIG. 2 diagrammatically shows a variant of the embodiment described in relation to FIG. 1.

According to this variant, the method comprises a step 50 of expanding dynamic range during which the dynamic ranges of each image $I_3^i$ and of each image $I_2^i$ are extended by application of an operator EOi which is the inverse of that TMOi used to obtain said image $I_2^i$.

The distortion Di is thus calculated between two images whose dynamic range is that of the original image. More specifically, the distortion Di is calculated between the original image modified $I_2^i$ by said image dynamic range conversion operator TMOi, and a reconstructed version after coding and decoding the original image modified $I_2^i$ by said image dynamic range conversion operator TMOi, the dynamic ranges of the image $I_2^i$ and of this reconstructed version having been extended during step 50.

This variant makes it possible to know which is the image dynamic range conversion operator which makes it possible to obtain a better compression rate without needing to refer to the original image.

Figure 3:
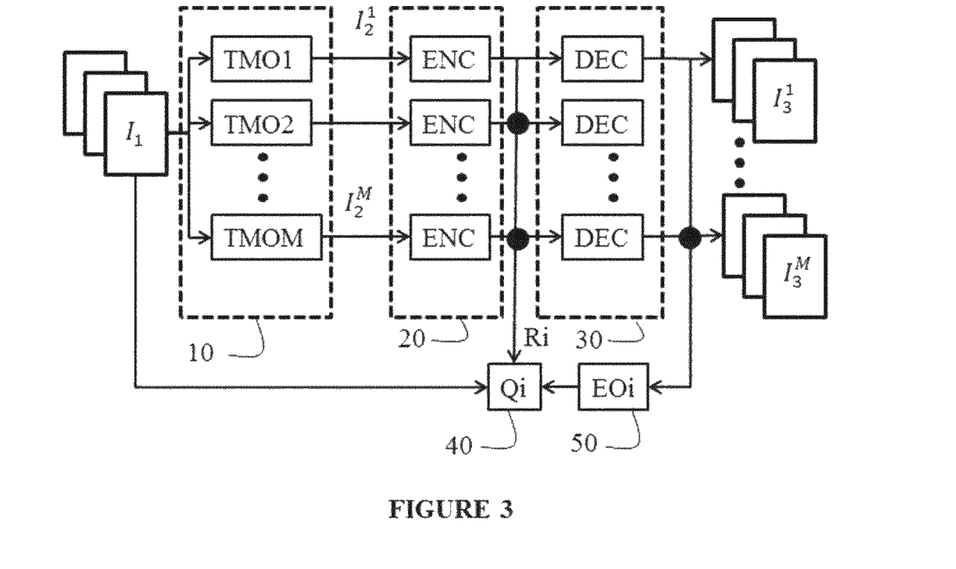
FIG. 3 shows a diagram of a variant of the method for selecting an image dynamic range conversion operator.

FIG. 3 diagrammatically shows a variant of the embodiment described in relation to FIG. 1.

According to this variant, the distortion Di is calculated between the original image $I_1$ and an image $I_3^i$, the dynamic range of this reconstructed version $I_3^i$ being extended by application of an operator EOi which is the inverse of that TMOi used to obtain the modified image $I_2^i$ (step 50).

The invention is in no way limited to one type of image or image sequence coding or image dynamic range conversion operator.

However, in the case where a method for image sequence coding uses a temporal predictor, the inventor has observed that the image dynamic range conversion operator selected was that (or one of those) whose resultant images were processed in order to preserve the temporal coherence between the images of the original image sequence. In fact, there are two major reasons which cause the degradation of the performances of a motion estimator used in a temporal predictor.

The first comes from a flickering in the luminance values from one image to another which appears when no processing is applied to the images modified by an image dynamic range conversion operator. These flickering artefacts are due to the change in the key values relative to temporally successive images. In fact, if the key k changes from one image to another, the modification curve (of sigmoid form) also changes, which results in different modifications for luminance values nevertheless similar in the original images.

The second comes from the non-preservation of the temporal coherence of the brightness of the original images. In fact, as the quality of a motion estimator lies in the low dynamic range of the residue image obtained from the difference between the original image and the predicted image, the more incoherent the prediction image with the original image in terms of brightness, the more this residue image will have a high dynamic range.

According to a variant of the method, the quality criterion Qi is also a function of the bitrate Ri of the modified $I_2^i$ and coded original image.

The quality criterion Qi is then given by:

$$Qi = \gamma * Ri + Di$$

where Ri is the size of an image or the bitrate of an image sequence calculated from the images $I_2^i$.

The distortion Di is for example given by a distance of mean square error (MSE) type. The invention is not limited to such a metric and any other metric can be used.

The image dynamic range conversion operator which is selected at the end of the method is therefore that which optimises (minimises in the case of a square error) the quality criterion Qi.

In the case where the image dynamic range conversion operator is given by equations (2) and (4), the corresponding operator EOi is given by:

$$L_s = \frac{L_d}{1 - L_d}$$

where $$L_w = L_s \cdot \frac{k}{a}$$

and where a is the chosen exposure value and k is the key given by equation (3).

If the operator calculates a key as a function of the pixels of this image and the pixels of a predetermined number of images which temporally precede the image to be converted in the image sequence then the new key must be used.

In the case where the image dynamic range conversion operator compares an original image using a visual response of the human visual system (HVS) with an image whose luminance values belong to a dynamic range adapted to a screen, a minimisation of a residual error between the results of the responses of the human visual system is calculated during these methods. This minimisation results in a conversion curve which is piece-wise linear and calculated image by image. The corresponding operator EOi is then calculated by inverting the conversion curve which is piece-wise linear and calculated image by image, and this for each image.

According to a variant relating to the case where an image dynamic range conversion operator is followed by processing which preserves the temporal coherence of the images of the original image sequence, the inverse processing of this processing is applied to the image $I_3^i$ before the inverse operator is applied to this image.

For example, in the case where the processing is that given by equation (9), the inverse processing will be given by:

$$L_d = \frac{1}{R} L'_d$$

where $L'_d$ is the luminance component of the image $I_3^i$.

Figure 4:
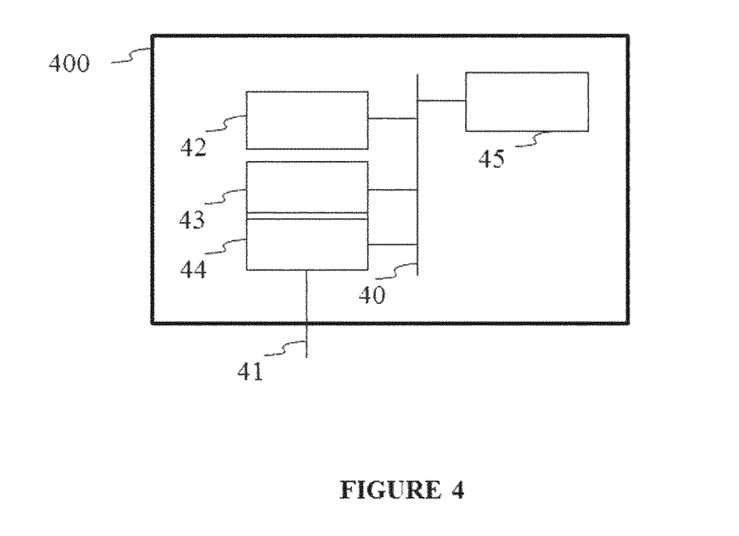
FIG. 4 shows a block diagram of a device for selecting an image dynamic range conversion operator which implements a method according to the invention.

According to one of its hardware aspects, the invention relates to a device 400 for selecting an image dynamic range conversion operator described with reference to FIG. 4.

Device 400 comprises the following elements, interconnected by a digital address and data bus 40:

A calculation unit 43 (also called a central processing unit);
A memory 45;
A network interface 44, for interconnections between device 400 and other remote devices connected via a connection 41;

The calculation unit 43 can be implemented by a (possibly dedicated) microprocessor, a (possibly also dedicated) microcontroller, etc. The memory 45 can be implemented in a volatile and/or non-volatile form such as a RAM (random access memory), a hard disc, an EPROM (erasable programmable ROM), etc. Device 400 is configured to implement a method according to the invention described in relation to FIGS. 1 to 3.

For this purpose, means 43, 44 and possibly 45 cooperate with each other to apply an image dynamic range conversion operator TMOi to an original image $I_1$ to obtain a modified image $I_2^i$, whose dynamic range is lower than that of the original image, and to optimise a quality criterion to select a dynamic range conversion operator. The means for optimising the quality criterion are configured so that said quality criterion Qi is calculated for each image dynamic range conversion operator TMOi as a function of a distortion Di calculated from a reconstructed version $I_3^i$ after coding and decoding the original image modified $I_2^i$ by said image dynamic range conversion operator TMOi.

According to another hardware aspect, the invention relates to a system CONV for converting the dynamic range of an image whose luminance values belong to a given dynamic value range (HDR) to an image whose luminance values belong to a lower dynamic value range (LDR) than that of the original image. This is usually referred to as HDR to LDR dynamic range reduction.

Figure 5:
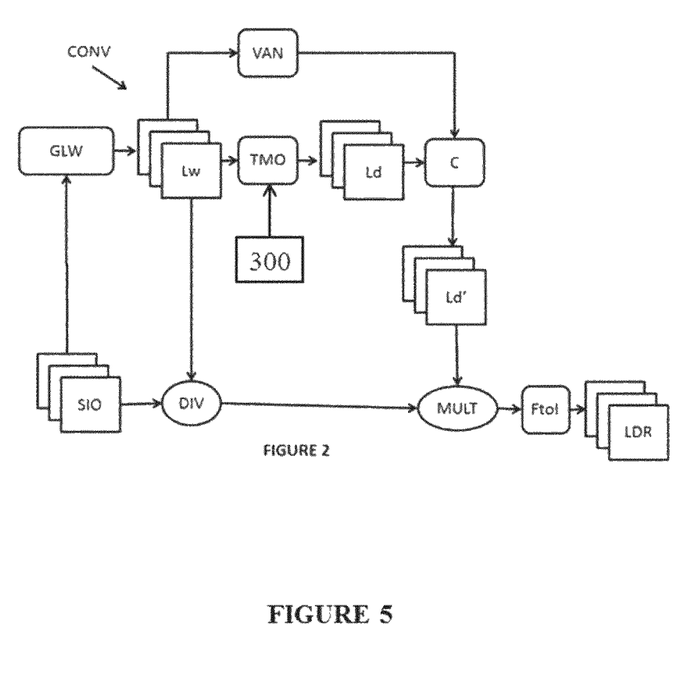
FIG. 5 shows a block diagram of a system for converting image dynamic range according to the invention.

FIG. 5 shows a block diagram of such a system for converting an image which implements a method according to the invention.

The system CONV comprises M (>1) dynamic range conversion operators TMOi which are intended to be applied to luminance component Lw of an original image SIO to obtain a modified image whose luminance values belong to a lower dynamic value range LDR than that of image SIO (HDR).

In the case of a colour image, the system CONV comprises means GLW for obtaining the luminance component Lw of this colour image SIO. For example if an image SIO is expressed in an (R, G, B) colour space, the image is transformed in order to be expressed in the (X, Y, Z) colour space so as to recover the Y channel of the (X, Y, Z) space which forms the luminance component Lw. It is widely known to use such colour space transformation means. Other examples of means GLW can be used without leaving the scope of the invention. The system CONV also comprises means DIV and MULT for the purpose of conserving a constant saturation and the hue of the colours. These means DIV are configured to divide the R, G and B colour components corresponding to a colour image SIO by component Lw and means MULT are configured to multiply the R, G and B colour components thus modified by the modified luminance component. The three components originating from this multiplication are then expressed in floating values. To obtain a modified image LDR, these three components originating from this multiplication are submitted at the input of means Ftol of the system CONV and undergo a conversion of their values to whole values which belong to a dynamic value range for the screen on which the modified colour image must be displayed.

According to the invention, the conversion system also comprises a device for selecting the dynamic range conversion operator TMOo from among the M conversion operators TMOi. This device is in accordance with device 400 described in relation to FIG. 4.

According to another of its aspects, the invention relates to a method for coding an original image of given dynamic range and an image whose dynamic range lower than that of the original image has been obtained by application of an image dynamic range conversion operator to the original image.

An example of such a coding method is to predict each original image (an image often called the HDR image) using an image whose dynamic range is lower (an image often called the LDR image). This type of coding method also includes those which encode both the HDR image and the LDR image.

This type of coding method is characterised, according to the invention, in that the image dynamic range conversion operator used to obtain the LDR image is selected from among a set of image dynamic range conversion operators according to one of the methods described in relation to FIGS. 1 to 4. Moreover, in the case where an operator EOi is used by the selection method, the operator EOi carries out an operation which is the inverse of that produced by an operator TMOi.

In FIGS. 1 to 5, the modules shown are functional units that may or may not correspond to physically distinguishable units. For example, these modules or some of them can be grouped together in a single component or circuit, or constitute functions of the same software. On the contrary, some modules may be composed of separate physical entities. The devices and systems compatible with the invention are implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

The invention claimed is:

1. A method for selecting an image dynamic range conversion operator from among a set of image dynamic range conversion operators, said method comprising:
    applying each image dynamic range conversion operator to an original image to obtain a modified image, whose dynamic range is lower than that of the original image;
    calculating a quality criterion for each image dynamic range conversion operator, as a function of a distortion calculated between said modified image and a reconstructed version after coding;
    selecting an image dynamic with a minimum distortion among the distortion calculated; and
    decoding the image modified by said image dynamic range conversion operator based on the selected image dynamic.

2. The method according to claim 1, wherein the distortion is calculated between said modified image and said reconstructed version once their dynamic ranges have been extended by application of an operator which is the inverse of that conversion operator used to obtain said modified image.

3. The method according to claim 1, wherein said quality criterion is also a function of a bitrate of the modified and coded image.

4. A method for coding an original image of given dynamic range using an image whose dynamic range lower than that of the original image has been obtained by application of an image dynamic range conversion operator to the original image, wherein the image dynamic range conversion operator is selected from among a set of image dynamic range conversion operators according to the method of claim 1.

5. A device for selecting an image dynamic range conversion operator from among a set of image dynamic range operators, said device comprising for a processor configured to:
    apply an image dynamic range conversion operator to an original image to obtain an image, called the modified image, whose dynamic range is lower that of the original image,
    calculate a quality criterion for each image dynamic range conversion operator as a function of a distortion calculated between said modified image and a reconstructed version after coding;
    select an image dynamic with a minimum distortion among the distortion calculated; and
    decode the image modified by said image dynamic range conversion operator based on the selected image dynamic.

6. An apparatus for converting an original image sequence whose luminance values belong to a given dynamic value range, said apparatus comprising:
- several dynamic range conversion operators intended to be applied to luminance component of each image of the original image sequence to obtain a modified luminance component whose values belong to a lower dynamic value range than that of the original image sequence, and
- a device for selecting a dynamic range conversion operator from among said image dynamic range conversion operators which is in accordance with claim 5.

7. A device for coding an original image of given dynamic range using an image whose dynamic range lower than that of the original image has been obtained by application of an image dynamic range conversion operator to the original image, wherein the image dynamic range conversion operator is selected from among a set of image dynamic range conversion operators according to the device of claim 5.

* * * * *